(12) United States Patent
Hamy

(10) Patent No.: US 6,938,907 B2
(45) Date of Patent: Sep. 6, 2005

(54) LEAN-INDUCED STEERABLE WHEEL ASSEMBLY

(76) Inventor: Norbert Hamy, 2 Crediton Court, Toronto, Ontario (CA), M9B 3B9

(*) Notice: Subject to any disclaimer, the term of this patent is extended or adjusted under 35 U.S.C. 154(b) by 47 days.

(21) Appl. No.: 10/337,270

(22) Filed: Jan. 7, 2003

(65) Prior Publication Data

US 2003/0141689 A1 Jul. 31, 2003

Related U.S. Application Data

(60) Provisional application No. 60/344,811, filed on Jan. 7, 2002.

(51) Int. Cl.[7] .............................................. B62M 1/00
(52) U.S. Cl. ............................................. 280/87.042
(58) Field of Search ........................ 280/87.01, 87.021, 280/87.041, 87.042, 842

(56) References Cited

U.S. PATENT DOCUMENTS

| | | | | |
|---|---|---|---|---|
| 2,474,946 A | * | 7/1949 | Kinslow ................ | 280/87.042 |
| 4,088,199 A | | 5/1978 | Trautwein | |
| 4,740,000 A | * | 4/1988 | Moessner ................ | 280/7.12 |
| 5,048,632 A | * | 9/1991 | Battel ...................... | 180/181 |
| 5,169,166 A | * | 12/1992 | Brooks ................ | 280/87.042 |
| 5,232,235 A | * | 8/1993 | Brooks ................ | 280/87.042 |
| 5,330,214 A | * | 7/1994 | Brooks et al. ......... | 280/87.042 |
| 5,513,865 A | * | 5/1996 | Brooks et al. ......... | 280/87.042 |
| 5,819,865 A | * | 10/1998 | Cowley ................ | 280/93.502 |
| 6,279,930 B1 | * | 8/2001 | Chang et al. .......... | 280/87.042 |
| 6,382,646 B1 | * | 5/2002 | Shaw .................... | 280/87.041 |

FOREIGN PATENT DOCUMENTS

| CH | 446984 | * | 3/1968 | ............ 280/87.042 |
|---|---|---|---|---|
| GB | 2 225 990 A | | 6/1990 | |
| WO | 94/23810 | * | 10/1994 | ............ 280/87.042 |

* cited by examiner

*Primary Examiner*—Frank Vanaman
(74) *Attorney, Agent, or Firm*—Marks & Clerk; Richard J. Mitchell

(57) ABSTRACT

A lean-induced steerable wheel assembly has a pair of parallel wheel hub carriers arranged on either side of a leanable chassis spine. A linkage connects the wheel hub carriers to the chassis spine so that the wheels lean in unison with the chassis spine. A steering mechanism couples the wheel hub carriers to the chassis spine so that an induced lean on the chassis spine steers the wheel hub carriers through a steering angle dependent on the angle of induced lean.

29 Claims, 6 Drawing Sheets

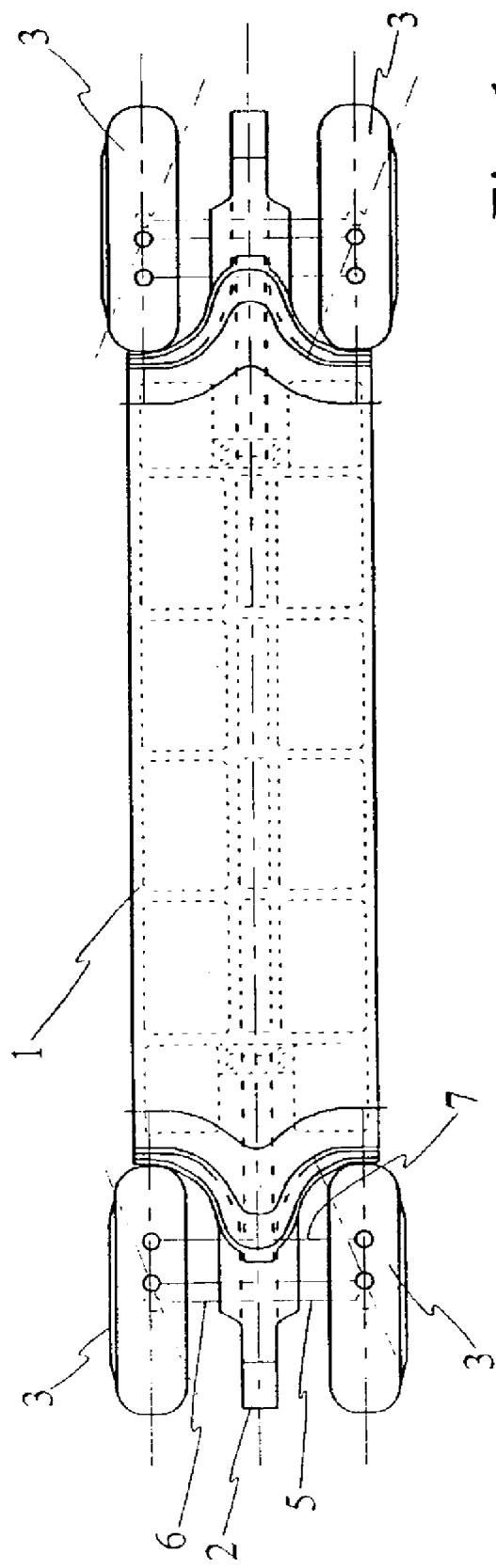
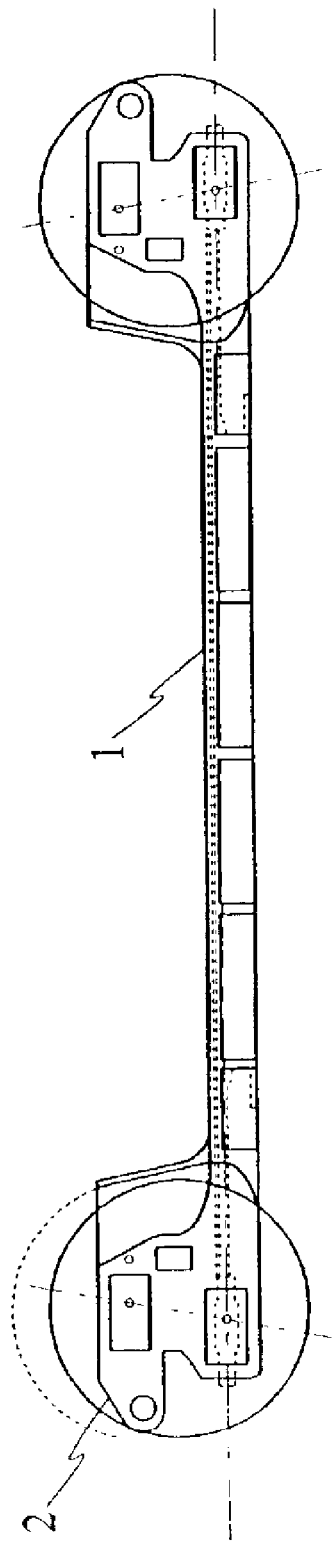

LEAN-INDUCED STEERABLE WHEEL ASSEMBLY

CROSS REFERENCE TO RELATE APPLICATIONS

This application claims the benefit under 35 USC 119(e) of U.S. provisional application Ser. No. 60/344,811, filed Jan. 7, 2002.

BACKGROUND OF THE INVENTION

1. Field of the Invention

This invention relates to the field of personal transport, and in particular to a lean-induced steerable wheel assembly for multi-wheel assemblies, as well as to a vehicle including one or more such assemblies.

2. Description of Related Art

Two-wheeled vehicles, such as bicycles or motorcycles are well known for their dynamic characteristic to lean into corners. The rider shifts weight to induce the lean position and this has the effect of steering the vehicle round a corner. Such vehicles, however, only have a single wheel on each axle.

Four wheeled vehicles are inherently more stable than two-wheeled vehicles, but such vehicles are not currently susceptible to lean-induced steering. Such vehicles, as in the case of a conventional automobile, must be steered with a manually operated steering wheel, which is not suitable for scooter like vehicles where the rider stands on a platform with one foot and powers the vehicle with the other foot.

SUMMARY OF THE INVENTION

The invention provides a steering assembly that can be used in association with scooters and like vehicles with more than one wheel on at least one of its axles. The steering assembly is actuated by the rider inducing a lean onto the vehicle, which results in the vehicle being steered in the intended direction without out the need for manual intervention.

According to the present invention there is provided a lean-induced steerable wheel assembly, comprising a pair of parallel wheel hub carriers arranged on either side of a leanable frame member; a linkage connecting said wheel hub carriers to said frame member so that said wheel hub carriers lean in unison with said frame member; and a steering mechanism coupling said wheel hub carriers to said frame member so that an induced lean on said frame member steers said wheel hub carriers through a steering angle dependent on the angle of induced lean.

This invention is suitable for vehicles, such as bicycles, personal scooters and the like, with two or more pairs of wheels mounted on the wheel hub carriers. It is also suitable for a vehicle with one pair of wheels, for example at the front, and a single wheel at the rear.

The frame member may be a chassis spine extending longitudinally along the length of the vehicle, or alternatively it could be in the form of one or more lugs capable of supporting the suspension beams and the elbow arm.

The wheels assume a lean angle, which is normally parallel to the central vertical axis of the leaning chassis platform. The front and rear pair of wheels preferably assume steering angles proportional to the lean angles of the wheels and chassis platform.

The present invention allows four wheeled vehicles, namely vehicles having two front wheels and two rear wheels, to achieve a similar leaning position, while automatically causing all wheels to steer on a common turn centre. Such steering action is fully induced by the lean angles of the wheels and chassis platform. The lean angles are achieved by the rider shifting weight in a manner consistent with centrifugal forces just as in a conventional standard two-wheeled vehicle.

In a preferred embodiment the linkage is a parallelogram linkage comprising a pair of upper and lower suspension beams. An elbow member acts pivoted at its midpoint below the upper suspension beam acts as a steering arm to pull the wheels through the desired steering angle dependent on the lean angle of the chassis.

The invention also provides a vehicle comprising a leanable chassis platform for supporting a rider and having front and rear wheel assemblies; and at least one of said wheel assemblies comprising a pair of parallel wheel hubs arranged on either side of a longitudinal frame member; a linkage connecting said wheel hubs to said frame member so that said wheel hubs lean in unison with said frame member; and a steering mechanism coupling said wheel hub carriers to said frame member so that an induced lean on said frame member steers said wheel hubs through a steering angle dependent on the angle of induced lean.

BRIEF DESCRIPTION OF THE DRAWINGS

The invention will now be described in more detail, by way of example only, with reference to the accompanying drawings, in which:

FIG. 1 is a plan view of a vehicle chassis platform;

FIG. 2 is a side view of the vehicle chassis platform;

DETAILED DESCRIPTION OF THE PREFERRED EMBODIMENTS

The invention will be described with reference to a personal scooter of the type having a platform on which the rider normally stands, an upright steering column and front and rear wheel assemblies. Unlike a conventional scooter, each wheel assembly consists of a pair of wheels so that the scooter as a whole has four wheels instead of the usual two. The vehicle could have more than two pairs of wheels, on in the alternative one pair of wheels and a single wheel. It will be appreciated that the invention has application to other types of vehicle, such as a "bicycle" having the usual single front and rear wheels replaced by wheel pairs as described.

Referring now to FIG. 1, the personal scooter comprises a rectangular platform 1 for receiving a rider's foot with a longitudinal chassis spine 2 on the underside of the platform. In this embodiment, the spine 2 extends along the length of the chassis 1 to provide longitudinal rigidity to the vehicle. A wheel assembly comprising a pair of wheels 3 is provided at each end of the platform 1.

Figure 3:
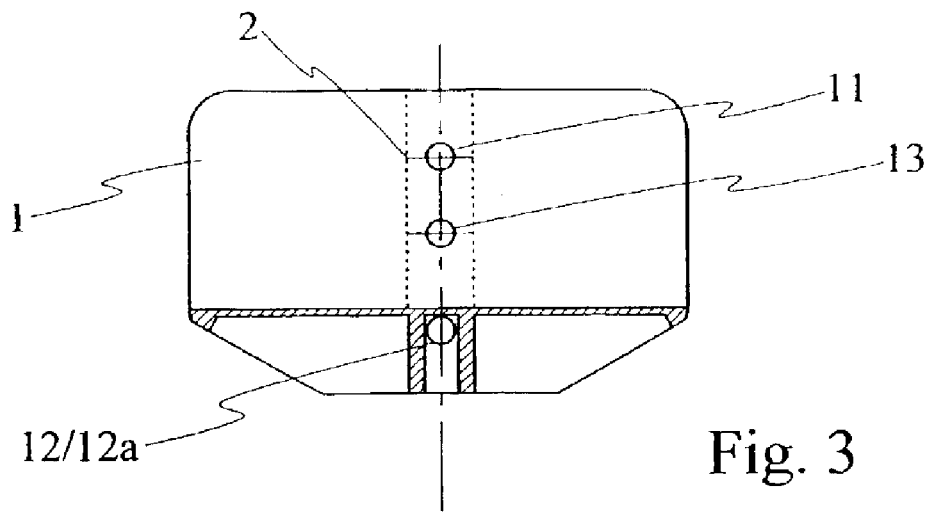
FIG. 3 is a cross sectional view of the vehicle chassis platform.
Figure 4:
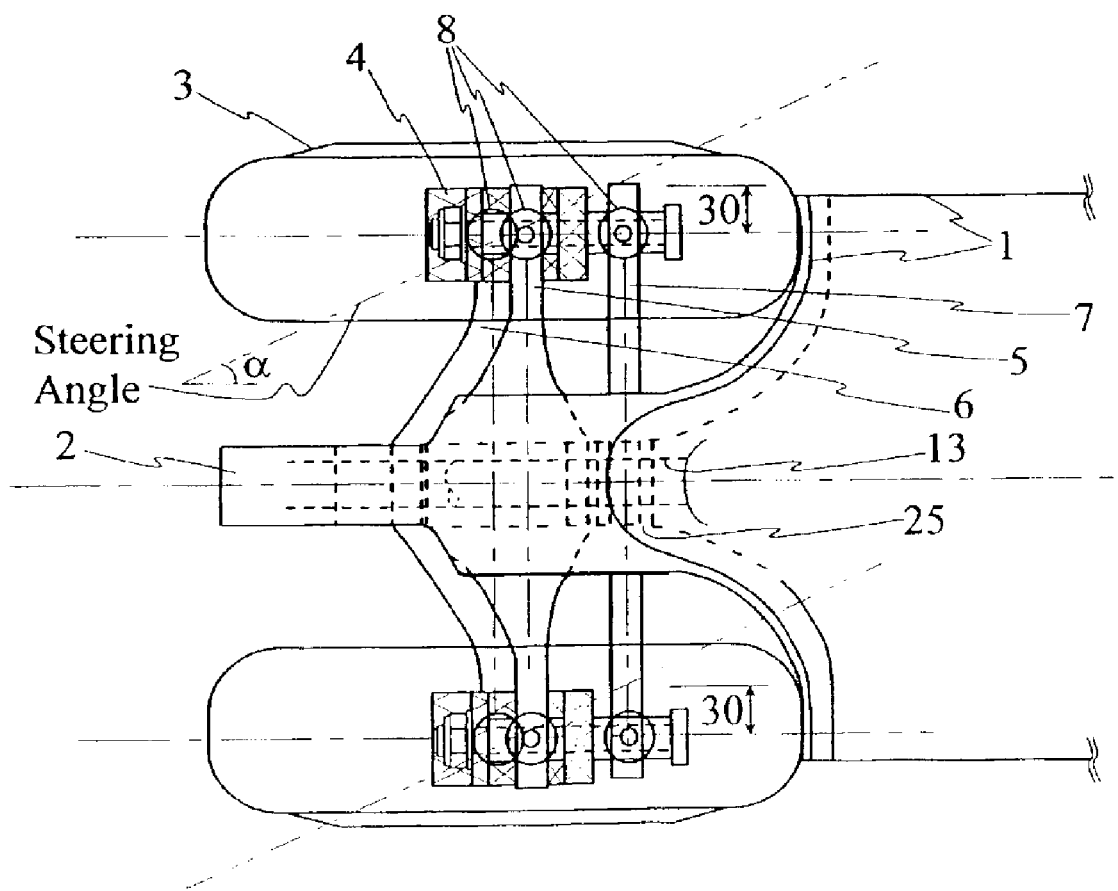
FIG. 4 is a plan view of a wheel bogie for the vehicle chassis platform shown in FIG. 1.

At each wheel assembly, an upper suspension beam 5, a lower suspension beam 6, extending generally parallel to the upper suspension beam 5, and an elbow steering arm 7, extend transversely relative to the chassis 1. As shown in FIG. 4, the suspension beams 5, 6 are mounted in a fore and aft arrangement to provide a negative caster angle.

The spine 2 has openings to accommodate the suspension beams and steering arm 7. The elbow 7 passes through an opening 25 (FIG. 4) longitudinally displaced relative to the upper and lower openings 26a, 26b (FIG. 6) for the upper and lower suspension beams.

The suspension beams 5 and 6, and elbow arm 7, are rockingly mounted on spine 2 by longitudinal shafts 11, 12, and 13, which allow them to pivot in a transverse vertical plane. The shafts 11, 12 and 13 are fixed to the beams 5 and 6, and arm 7 and thus rotate relative to the spine 2 as the latter pivot. The caster angle created by the fore and aft arrangement of the upper and lower suspension beams provides a self-centering effect.

The ends of suspension beams 5 and 6 and steering arm 7 are coupled to hub-carriers 4 through spherical ball joints 8, although other suitable universal couplings could be employed. The ball joints 8 of the upper suspension beam 5 are mounted on a common shaft 10 with the respective ball joints of the elbow arm 7.

The hub-carriers 4 are fitted with bearings 20 to receive axles, which are integral with the wheels 3. The wheel axle 3 is secured into the hub wheel bearings 20 by the central lock bolt 21. The wheels are equipped with tires 3a.

The line 50 passing through the ball joints 8 of the upper and lower suspension beams should be centrally located relative to the wheel perimeter. For this reason, the hub carrier 4 is recessed to accommodate the ball joints 8 and the end portions of the suspension beams 5, 6.

The geometry of the wheel assembly is such that as an induced lean is applied to the platform 1, and hence the chassis spines 2, the parallelogram linkage, consisting of the upper and low suspension beams 5, 6 and the hub carriers 4, causes the wheel hubs 4 to lean in unison with the chassis spine 2, preferably, though not necessarily, in equal amounts.

Figure 6:
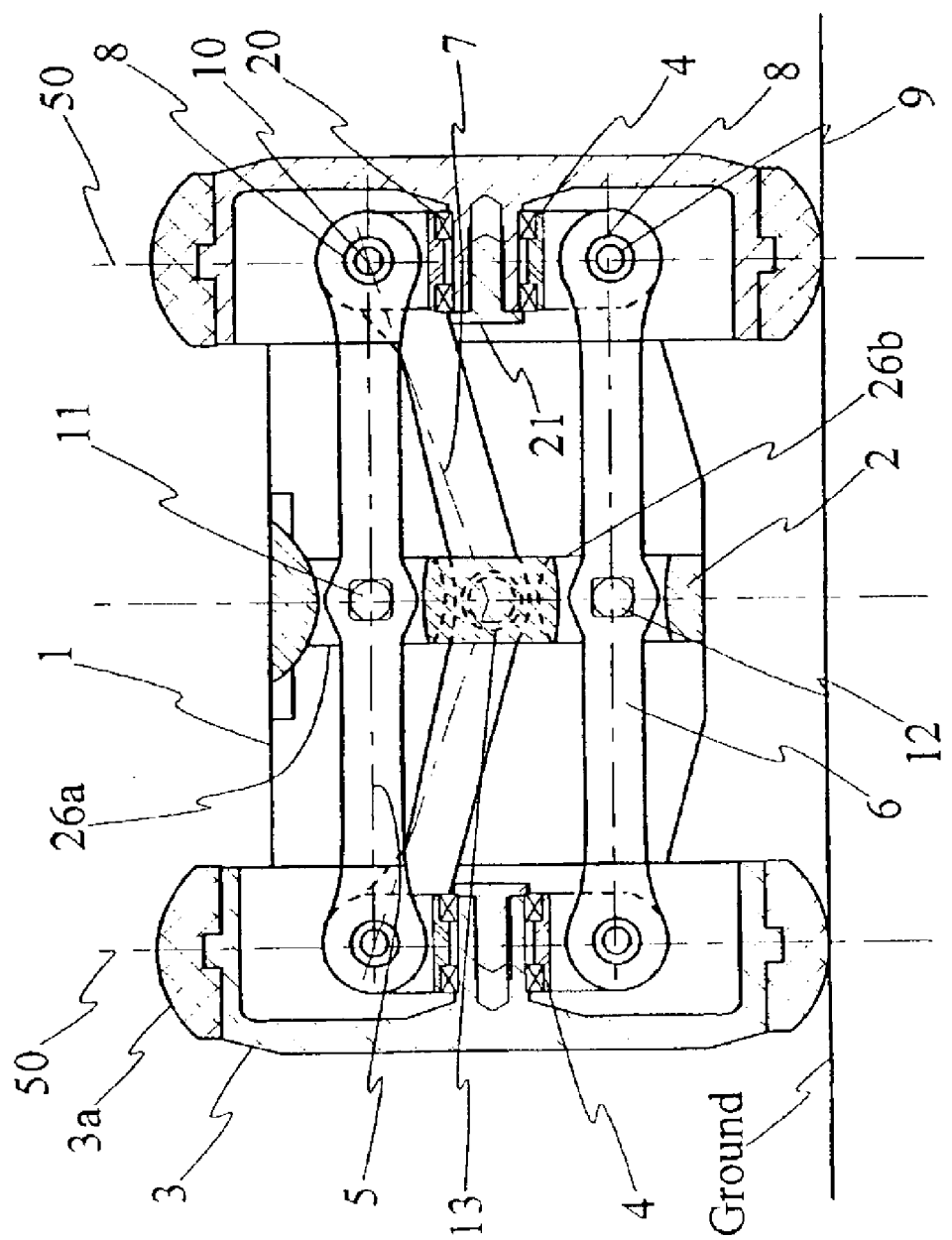
FIG. 6 is an end view of the wheel bogie in the static vertical position.
Figure 7:
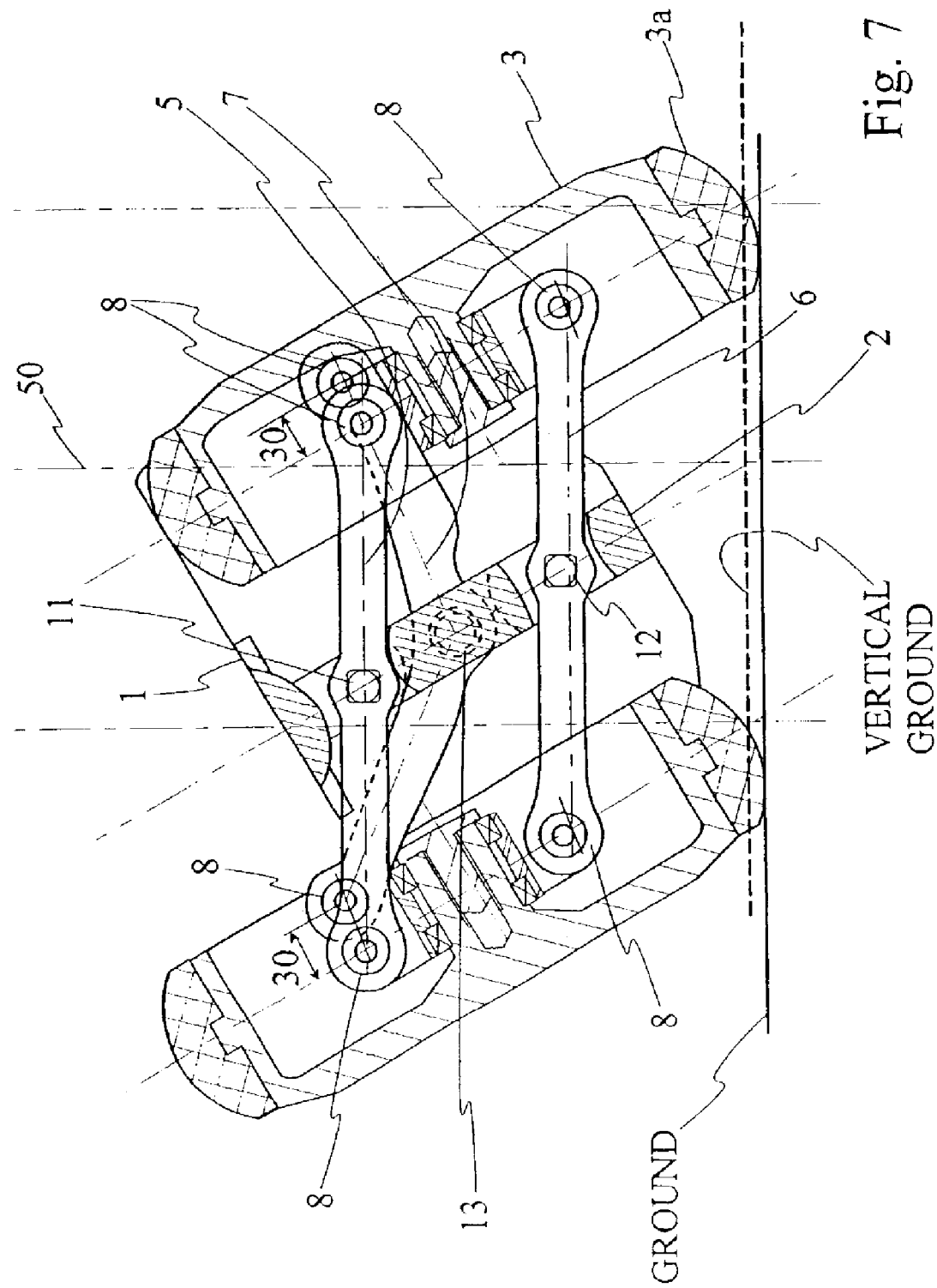
FIG. 7 is an end view of the wheel bogie in the dynamic leaning position.

The ball joints 8 at the ends of the steering arm 7 and suspension arm 6 are mounted on a common shaft 10 (FIG. 6). As the assembly leans, the steering arm 7 tilts and its end moves through a distance 30 (FIG. 7), which causes the wheel hub carrier 4 to turn through a steering angle α (FIG. 4), which depends on the amount and direction of lean.

Figure 5:
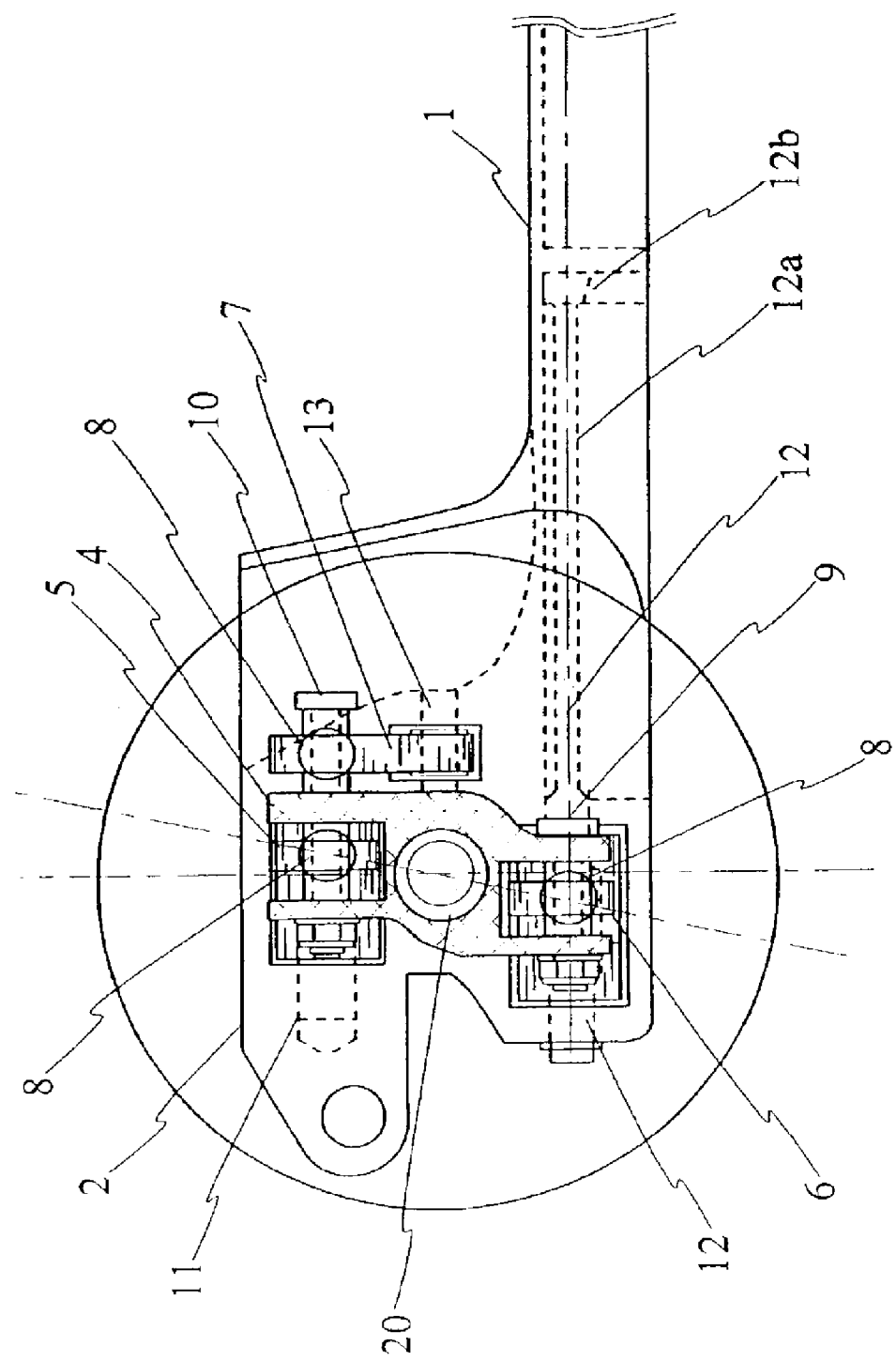
FIG. 5 is a side view of the wheel bogie.

As shown in FIG. 5, the lower suspension beam pivot shaft 12 has an extended portion 12a in the form of a torsion bar lying parallel to the chassis platform 1. The end of the extended portion 12a is anchored 12b in the central channel on the underside of the chassis 1. As the lower suspension beam 6 pivots, the torsion bar 12 twists and thus acts to tend to restore the assembly to the vertical, no-lean attitude and thereby provide a vertical self-aligning torque for the vehicle after leaning into a turn.

The front wheel assembly is identical to the rear wheel assembly except for the fact that the front and rear assemblies are mounted in 180° opposition. This causes the front and rear wheels to counter-steer around a common steering centre.

The placement of the central pivot 13 of the steering arm 7 assures that the inner wheels assume greater steering angles than the outer wheels. The central pivot 13 should be below the axis of the upper suspension beam 5 to ensure steering in the direction of lean and generally be between the upper and lower suspension beams 5, 6.

In use, the user propels the personal scooter in a manner similar to a conventional scooter by placing one foot on the chassis platform 1 and leaving the other foot free to periodically engage the ground and propel the scooter forward. An upstanding frame (not shown) at the front end of the chassis supports a fixed handle bar for the rider to hold on to. This handle bar does not directly participate in steering the scooter and serves only to provide support to the rider.

Figure 8:
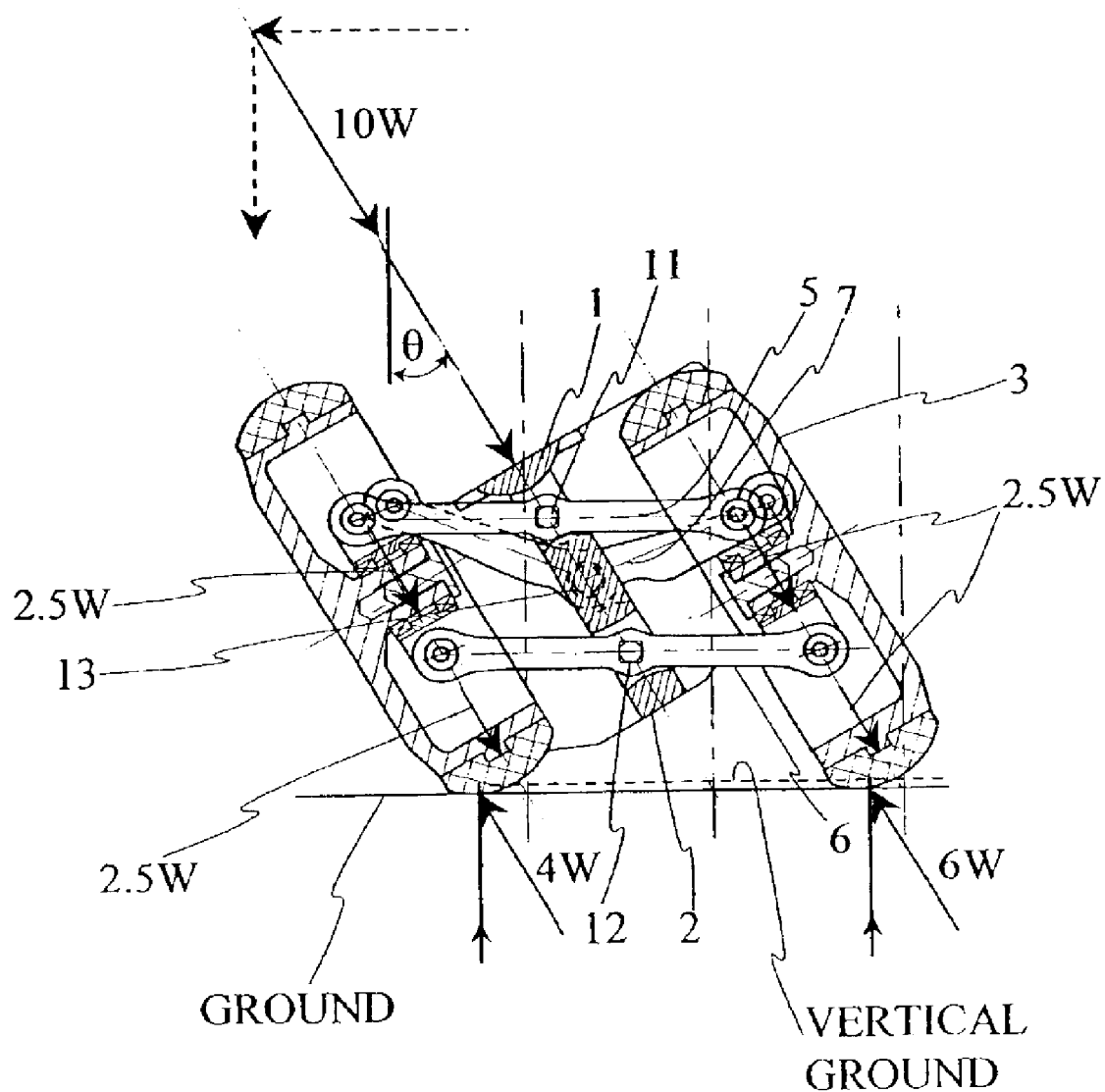
FIG. 8 shows the force vectors present when the vehicle is in the leaning position.

FIG. 8 shows the load distribution on the vehicle chassis platform 1 during the cornering leaning position. Weight shift on the chassis platform 1 determines the lean angle θ. This angle θ determines the steering angles α of the front and rear wheel assemblies. If the total load on the chassis platform 1 and spines 2 is low, this load is transmitted to suspension beams 5, 6 in equal amounts. The load is further transmitted equally to the ball-jointed ends of suspension beams 5, 6, resulting in a force of 2.5 W at each ball-jointed end assuming a total load of 10 W. It can be seen that each wheel is loaded equally, regardless of lean angle.

The ground load of the outer and inner wheel when cornering differs slightly due to the inward rotation of the contact point on the arc-profile tires 3a.

It should be noted that the torsion bar extension for vertical self-alignment can be either associated with the upper suspension beam or lower suspension beam. Vertical self-alignment torque arrangement by means other than torsion bar can be applied to suit the vehicle size and type.

Although the invention has been described and illustrated in detail, it is clearly understood that the same is by way of illustration and example only and is not to be taken by way of limitation, the spirit and scope of the present invention being limited only by the terms of the appended claims.

I claim:

1. A vehicle comprising:

a leanable platform for supporting a rider and having front and rear wheel assemblies; and said wheel assemblies comprising a pair of parallel wheel hub carriers arranged on either side of a longitudinal frame member supporting said platform;

a linkage connecting said wheel hub carriers to said frame member so that said wheel hub carriers lean in unison with said frame member, said linkage including a first suspension beam extending between said wheel hub carriers and pivotally coupled to said frame; and a steering mechanism coupling said wheel hub carriers to said frame member;

said steering mechanism comprising a cranked steering arm pivotally coupled to said frame member at a mid portion of said steering arm and to said wheel hub carriers at respective ends of said steering arm; and each hub carrier being coupled to one end of said first suspension beam and one end of said steering arm through respective universal couplings mounted on said hub carriers on a common shaft in a fixed fore and aft relationship so that as said frame member leans said steering arm pivots about said frame member and pulls said wheel hub carriers through a steering angle dependent on the angle of induced lean.

2. A vehicle as claimed in claim 1, wherein said wheel assemblies are mounted 180° in opposition to result in opposite steering angles so that all wheels steer around a common centre.

3. A vehicle as claimed in claim 1, wherein said linkage further comprises a second suspension beam, said first and second suspension beams providing a pair of upper and lower suspension beams pivotally coupled at their end portions to said respective wheel hub carriers and in the vicinity of a mid point of said suspension beams to said frame member.

4. A vehicle as claimed in claim 3, wherein said upper and lower suspension beams form a parallelogram linkage.

5. A vehicle as claimed in claim 4, wherein said lower suspension beam is coupled to said wheel hub carriers by universal couplings.

6. A vehicle as claimed in claim 5, wherein said cranked steering arm comprises an elbow member pivotally connected to said frame member at a mid-point thereof.

7. A vehicle as claimed in claim 6, wherein said elbow member has a central pivot point positioned in a vertical plane between the upper and lower suspension beams.

8. A vehicle as claimed in claim 3, wherein at least one of said suspension beams is coupled to said frame member by a torsion bar that acts to restore said frame member to the non-lean position.

9. A vehicle as claimed in claim 8, wherein said torsion bar is coupled to the lower said suspension beam.

10. A vehicle as claimed in claim 5, wherein said universal couplings are ball joints.

11. A vehicle as claimed in claim 10, wherein said upper and lower suspension beams are mounted in a fore and aft arrangement to provide a caster angle.

12. A vehicle as claimed in claim 11, wherein said elbow member is pivotally mounted to said frame member below said upper suspension member.

13. A vehicle as claimed in claim 1, wherein said frame member imparts an equal lean angle to all said wheel hub carriers.

14. A vehicle as claimed in claim 1, wherein said frame member forms part of a chassis of a vehicle.

15. A vehicle as claimed in claim 14, wherein said vehicle is a personal scooter.

16. A lean-induced steerable wheel assembly, comprising:
 a pair of parallel wheel hub carriers arranged on either side of a leanable longitudinal frame member;
 a linkage connecting said wheel hub carriers to said frame member so that said wheel hub carriers lean in unison with said frame member, said linkage including a first suspension beam extending between said wheel hub carriers and pivotally coupled to said frame; and
 a steering mechanism coupling said wheel hub carriers to said frame member;
 said steering mechanism comprising a cranked steering arm pivotally coupled to said frame member at a mid portion of said steering arm and to said wheel hub carriers at respective ends of said steering arm; and
 one end of said first suspension beam and one end of said steering arm being coupled to each wheel hub carrier through respective universal couplings mounted on a common shaft in a fixed fore and aft positional relationship on said hub carrier so that as said frame member leans, said steering arm pivots about said frame member and pulls said wheel hub carriers through a steering angle dependent on the angle of induced lean.

17. A lean-induced steerable wheel assembly as claimed in claim 16, wherein said linkage further comprises a second suspension beam pivotally coupled at respective ends thereof to said respective wheel hub carriers and in the vicinity of a mid point thereof to said frame member.

18. A lean-induced steerable wheel assembly as claimed in claim 17, wherein said first and second suspension beams provide respective upper and lower suspension beams, which together form a parallelogram linkage.

19. A lean-induced steerable wheel assembly as claimed in claim 18, wherein said lower suspension beam is coupled to said wheel hub carriers by universal couplings.

20. A lean-induced steerable wheel assembly as claimed in claim 19, wherein said cranked steering arm is an elbow member pivotally connected to said frame member at a mid-point thereof.

21. A lean-induced steerable wheel assembly as claimed in claim 18, wherein said upper and lower suspension beams are mounted in a fore and aft arrangement to provide a caster angle.

22. A lean-induced steerable wheel assembly as claimed in claim 21, wherein said cranked steering arm is pivotally mounted to said frame member below said upper suspension beam.

23. A lean-induced steerable wheel assembly as claimed in claim 18, wherein at least one of said suspension beams is coupled to said frame member by a torsion bar that acts to restore said frame member to the non-lean position.

24. A lean-induced steerable wheel assembly as claimed in claim 23, wherein said torsion bar forms an extension of a pivot shaft fixed to said at least one suspension beam.

25. A lean-induced steerable wheel assembly as claimed in claim 16, wherein said universal couplings are ball joints.

26. A lean-induced steerable wheel assembly as claimed in claim 16, wherein said frame member imparts an equal lean angle to said wheel hub carriers.

27. A lean-induced steerable wheel assembly, comprising:
 a pair of parallel wheel hub carriers arranged on either side of a leanable longitudinal frame member;
 a linkage connecting said wheel hub carriers to said frame member so that said wheel hub carriers lean in unison with said frame member, said linkage comprising a pair of upper and lower suspension beams forming a parallelogram linkage and pivotally coupled in the vicinity of a mid point of said suspension beams to said frame member; and
 an elbow member pivotally connected to said frame member at a mid-point of said elbow member, said upper suspension beam and said elbow member being coupled to said wheel hub carriers by universal couplings mounted on a common shaft so that as said frame member leans, said elbow member pivots and thereby steers said wheel hub carriers through a steering angle dependent on the angle of induced lean.

28. A lean-induced steerable wheel assembly as claimed in claim 27, wherein said universal couplings are ball joints.

29. A lean-induced steerable wheel assembly as claimed in claim 27, wherein at least one of said suspension beams is coupled to said frame member by a torsion bar that acts to restore said frame member to the non-lean position.

* * * * *